(No Model.)

C. E. HADLEY.
PNEUMATIC TIRE.

No. 492,580. Patented Feb. 28, 1893.

Witnesses
Charles E. Hadley.
Inventor
By atty

UNITED STATES PATENT OFFICE.

CHARLES E. HADLEY, OF CHICOPEE, MASSACHUSETTS, ASSIGNOR TO THE OVERMAN WHEEL COMPANY, OF HARTFORD, CONNECTICUT.

PNEUMATIC TIRE.

SPECIFICATION forming part of Letters Patent No. 492,580, dated February 28, 1893.

Application filed October 31, 1892. Serial No. 450,518. (No model.)

*To all whom it may concern:*

Be it known that I, CHARLES E. HADLEY, of Chicopee, in the county of Hampden and State of Massachusetts, have invented a new Improvement in Pneumatic Tires for Cycles; and I do hereby declare the following, when taken in connection with accompanying drawings and the letters of reference marked thereon, to be a full, clear, and exact description of the same, and which said drawings constitute part of this specification, and represent, in—

Figure 1:
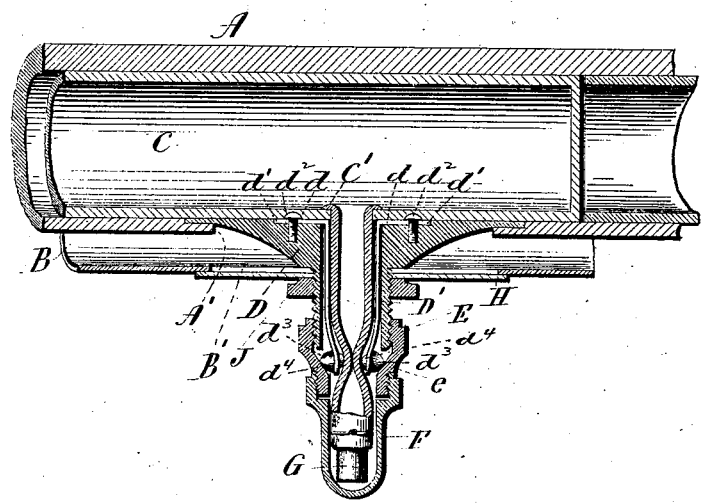
Figure 2:
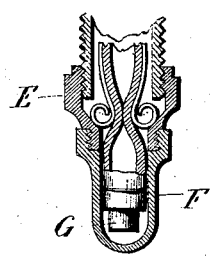

Figure 1, a broken view partly in elevation and partly in section of a pneumatic tire having its inflation tube provided with closing instrumentalities constructed in accordance with my invention. Fig. 2, a detached view of two spring compressors of modified form.

My invention relates to an improvement in pneumatic tires for cycles, the object being to provide simple, effective and convenient means for closing their inflation tubes.

With these ends in view, my invention consists in the combination with a pneumatic tire having an inflation tube, of one or more spring-recovered compressors located adjacent to the said tube, and means for forcing the said compressor or compressors against the tube for closing it.

My invention further consists in certain details of construction and combinations of parts as will be hereinafter described and pointed out in the claims.

As herein shown, the pneumatic tire comprises a flexible jacket A, which is permanently secured to the rim B, and a removable inner air-tube C, adapted to be introduced into the jacket A, through an opening A', formed therein, and through an aligned port or door-way B', formed in the inner periphery of the said rim B. The air-tube C, is provided with a lateral inflation tube C', which is cemented to it at a point near one of its ends, which are thus left free for direct abutment against each other, as shown, when inflated. The said inflation tube C', passes through a coupling-plate D, longitudinally bowed, and inserted through the port B', in the rim, and the opening A', in the jacket, into the interior of the latter, where its ends rest upon the said jacket at points adjacent to the ends of the opening therein, the plate being canted for its introduction into, and its removal from the interior of the jacket. The said plate is provided midway of its length with an outwardly projecting externally threaded sleeve D'; through which the inflation tube C', passes and projects. Two springs $d\ d$, are arranged longitudinally within the said sleeve at opposite points therein, their inner ends being bent down at right angles into recesses $d'\ d'$ formed for them in the inner face of the plate D, and secured in place by screws $d^2$. The outer ends of the said springs extend beyond the outer end of the said sleeve, and are furnished with small buttons $d^3$, having conical heads, their shanks being upset on the inner faces of the springs to form very small conical or beveled bosses $d^4\ d^4$, which engage with the said tube C', at opposite points thereon. Each of these springs and its button form what I may term a spring-recovered compressor, which is to say, a device adapted to affect the compression of the tube to close its opening when forced inward, but recovering when left free, to permit the elastic tube to resume its normal shape. Preferably I employ two of these compressors, whatever their particular construction may be, but I can conceive an embodiment of my invention which should contain only one. The outer ends of these compressors, which engage with the inflation tube, do so at points within the outer end of the same, that being necessarily free to permit it to be connected with the apparatus of inflation, whatever that may be. A compression collar E, having a knurled edge, (not shown,) and made larger at its inner than at its outer end, is provided at its inner end with internal screw-threads, which take into the exterior screw-threads of the sleeve over which the collar fits like a cap. The said collar is provided with an internal annular bevel $e$, which engages with the conical heads of the buttons $d^3$, and forces them together when the collar is turned inward, so as to compress the tube and close it, as clearly shown by the drawings. The outer end of the collar is provided with external threads, which are taken into by an internally threaded cap F, having a closed outer end, the said cap fitting over and inclosing the extreme outer end of the tube C', which is provided with an internally threaded nipple G, by means of which the tube, and hence the air-tube C, are connected with an air-pump, or other apparatus of inflation. The sleeve D, also receives a longitudinally bowed plate H, which normally closes the port or door-way B', formed in the rim, the plate being held in place by a nut J, screwed against it, and mounted on the sleeve.

When it is desired to inflate the tube C, the cap F, is removed, and the nipple of its inflation tube C, is connected with the pump or other apparatus of inflation, and the compression collar E, removed or adjusted so as to permit the buttons $d^3$, to separate under the action of the springs $d$, to which they are attached, leaving a free opening through the inflation tube. Then when the said tube C, has been pumped full of air, and before the inflation tube C', is disconnected from the apparatus of inflation, the compression collar is turned inward on the sleeve D', whereby the buttons $d^3$, are forced upon the tube at opposite points thereof, so as to completely close its opening, after which the apparatus of inflation may be disconnected from it without allowing any air to escape. When the tube C, is introduced into or withdrawn from the jacket A, the plates D, and H, are removed, and the tube deflated by allowing its air to escape, but as that is not new with me, I will not enter into a detailed description of it here.

It is apparent that the application of my invention is not limited to the exact construction shown and described. For instance, instead of providing the outer ends of the springs $d$, with buttons $d^3$, as shown, I might coil the said ends of the springs upon themselves, as seen in Fig. 2, and secure the same results. Or, the springs and the compression-collar might be applied to the inflation tube of a pneumatic tire or other construction, that is, one not composed of a permanent jacket and a removable air-tube. I therefore wish it to be understood that as I have used the term pneumatic tire, I mean any inflated tire, and not the particular compound form of inflated tire that I have illustrated. Nor am I obliged to use my invention in connection with such a coupling-plate and door as I have described, although it is particularly applicable to such construction. I would therefore have it understood that I do not limit myself to the exact construction herein shown and described, but hold myself at liberty to make such changes and alterations as fairly fall within the spirit and scope of my invention.

I am aware that compressing devices for closing the inflating tubes of pneumatic tires are old, and I do not, therefore, claim them broadly, but only when spring-recovered.

Having fully described my invention, what I claim as new, and desire to secure by Letters Patent, is—

1. The combination with a pneumatic tire having an inflation tube, of one or more spring-recovered compressors located adjacent thereto, and means for forcing the said compressor or compressors against the tube for closing it, substantially as described.

2. The combination with a pneumatic tire having an inflation tube, of one or more spring-recovered compressors located adjacent thereto, and a compression-collar for engaging with the free ends of the said compressor or compressors for contracting the tube to close it, substantially as described.

3. The combination with a wheel-rim, of a pneumatic tire having an inflation tube extending through an opening in the said rim, and externally threaded sleeve connected with the rim in position to have the inflation tube of the tire extend through and project from it, one or more springs located within the said sleeve and extending longitudinally therewith, and constructed at their free ends to engage with the said tube, and a compression-collar mounted upon the outer end of the said sleeve, and constructed to engage with the said ends of the springs for drawing the same upon the tube to close it, substantially as described.

4. The combination with a rim constructed with a port or door-way, of a flexible jacket attached to the said rim, and having an opening aligned with the said port, a removable inner air-tube adapted to be introduced into and withdrawn from the said jacket through the said port and opening, and having an inflation tube arranged laterally to one of its ends; a coupling-plate adapted to be connected with the rim and jacket, located in the openings of the same, and provided with an externally threaded sleeve through which the inflation tube passes, and from which the said tube projects; one or more compressors located within the said sleeve, and constructed at their outer ends to engage with the inflation tube, a plate and a nut mounted on the said sleeve for closing the opening in the rim, a compression collar mounted on the outer end of the sleeve, and constructed to engage with the outer ends of the compressor or compressors for forcing the same inward against the tube, a cap attached to the said collar to inclose the outer end of the tube, and a nipple secured to the end of the tube for the attachment of the apparatus of inflation, substantially as described.

In testimony whereof I have signed this specification in the presence of two subscribing witnesses.

CHARLES E. HADLEY.

Witnesses:
A. H. BENTON,
JEROME W. DOTEN.